July 24, 1923.
O. A. THOMAS
BEET PULLER
Filed Feb. 3, 1921
1,462,948
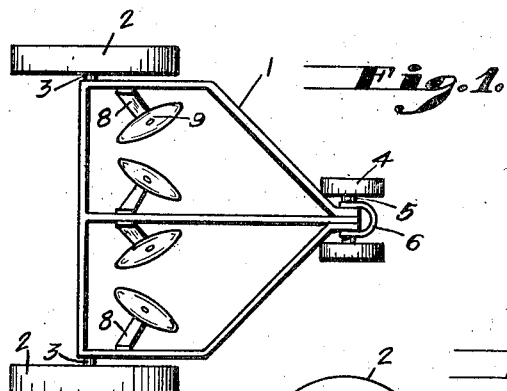
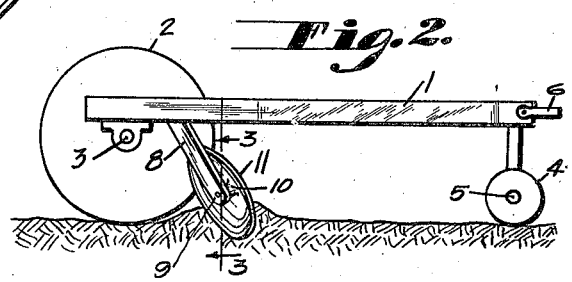
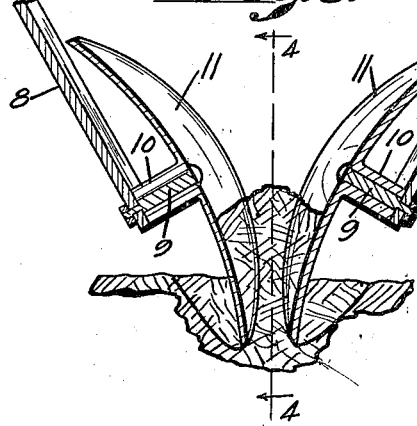 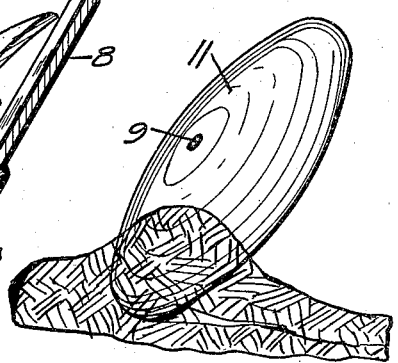
Oscar A. Thomas
INVENTOR.
BY
Hazard & Miller
ATTORNEYS Patented July 24, 1923.

1,462,948

UNITED STATES PATENT OFFICE.

OSCAR A. THOMAS, OF OXNARD, CALIFORNIA.

BEET PULLER.

Application filed February 3, 1921. Serial No. 442,209.

*To all whom it may concern:*

Be it known that I, OSCAR A. THOMAS, a citizen of the United States, residing at Oxnard, in the county of Ventura and State of California, have invented new and useful Improvements in Beet Pullers, of which the following is a specification.

It is the object of this invention to provide an agricultural implement for pulling beets and the like.

The invention consists primarily in the provision of disc members inclined downwardly toward one another and also inclined rearwardly toward one another, so that when drawn through the earth the strip of earth between the facing surfaces of the discs will be raised by the latter and thereby cause beets or the like in said strip of earth to be lifted between the discs and then allowed to lie upon the surface of the earth as the discs move beyond the same.

The invention will be readily understood from the following description of the accompanying drawings, in which:—

Figure 1 is a plan view of an implement constructed in accordance with the invention.

Fig. 2 is a side elevation of the same with the near wheel of the device removed so as to show the position of the operating discs.

Fig. 3 is a detail section on the line 3—3 of Fig. 2.

Fig. 4 is a similar section on the line 4—4 of Fig. 3.

An implement constructed in accordance with the invention, may comprise any suitable frame shown as a vehicle frame 1 having rear wheels 2 mounted upon axle 3, and front wheels 4 mounted upon axle 5. A draft connection is shown at 6.

Any number of lifting elements may be mounted upon the frame of the machine, and in the present instance I have shown two such elements adapted to operate in connection with two rows of beets or the like. It will be obvious that a machine may be constructed having any number of lifting elements arranged to function in connection with any number of rows of beets or the like during the operation of the device.

Each of the lifting elements comprise two discs arranged face to face and suspended from the frame of the machine by any suitable means shown as comprising arms 8 forming stub axles 9 at their lower ends for bearings 10 projecting beyond the rear faces of the discs 11. The discs 11 are dished and are arranged with their front or convex surfaces face to face, as clearly shown in Fig. 3. The two discs forming an element are so arranged as to converge toward their lower edges and to also converge toward their rear edges, and the discs may be reversibly spaced with relation to one another in order to provide for the passage of beets or the like of different sizes.

In operation the implement is drawn forward with the space between discs forming an element in alinement with a row of beets or the like which are to be pulled. The discs of the pulling implement are so mounted as to extend within the ground an appreciable distance, and as the machine moves forward the strip of earth carrying the beets will be cut by the discs forming an implement and lifted between the same, due to the inclination of the discs relative to one another and to the arrangement of the facing surfaces of the discs as convex surfaces.

It will be understood that the beets or the like will be raised with the strip of earth thus lifted and will be deposited upon the ground as the implement moves beyond the same. It will be noted that the provision of two discs facing toward one another will lift a strip of earth and allow the same to fall back in position along the strip cut by the discs as the machine moves forwardly, and as a consequence the beets or the like will be lifted without turning the earth and forming a furrow.

Various changes may be made without departing from the spirit of the invention as claimed.

What is claimed is:

A device for pulling beets and the like comprising dished rotating discs having their convex surfaces facing toward one another and converging rearwardly, said convex surfaces also converging downwardly at their upper portions and then diverging at the lower portions of the peripheries of said discs.

In testimony whereof I have signed my name to this specification.

OSCAR A. THOMAS.